Patented May 24, 1938

2,118,586

UNITED STATES PATENT OFFICE 2,118,586

THERMOPHORIC COMPOSITION

John A. C. Bowles, Boston, and Ronald Lyman McFarlan, Marblehead Neck, Mass., assignors to United Drug Company, Boston, Mass., a corporation of Delaware No Drawing. Original application December 18, 1936, Serial No. 116,514. Divided and this application November 6, 1937, Serial No. 173,220

7 Claims. (Cl. 44—3)

This invention relates to thermophoric compositions, and with regard to certain more specific features, to thermophoric compositions adapted for use, for example, in heating pads.

This application is a division of our copending patent application Serial No. 116,514, filed December 18, 1936, entitled "Heating pad", now Patent No. 2,114,396, granted April 19, 1938.

Among the several objects of the invention may be noted the provision of a thermophoric composition or mixture which is adapted, under suitable conditions, to give off heat for a protracted period of time at an optimum temperature for the purposes of heating pads and the like; the provision of a thermophoric composition of the class described which is so constituted as to be unlikely to pass into a supersaturated solution condition when melted, but which, on the contrary, exhibits a substantially invariable tendency to recrystallize upon cooling, and thus to give off the sought heat; and the provision of a thermophoric composition which is made up of relatively economical and simple ingredients, and which is simple and economical to manufacture. Other objects will be in part obvious and in part pointed out hereinafter.

The invention accordingly comprises the elements and combinations of elements, and features of composition, which will be exemplified in the products hereinafter described, and the scope of the application of which will be indicated in the following claims.

In our aforesaid copending patent application, we have described and claimed a novel type of heating pad, as for bed use, a principal feature of which is the use, in the pad, of a thermophoric composition. After the pad is initially heated to a certain extent, it may be removed from the source of heat and thereafter it will give off heat for a protracted period of time. In the present application, the thermophoric composition which has been found most suitable for such a use is particularly described and claimed.

A preferred thermophoric composition coming within the scope of the present invention is as follows:

Percent by weight
Manganous chloride tetrahydrate
 (MnCl$_2$.4H$_2$O) _____ 3.45
Sodium acetate trihydrate
 (NaC$_2$H$_3$O$_2$.3H$_2$O) _____ 96.55

An alternative thermophoric composition, likewise found to be satisfactory, is as follows:

Percent
Manganous chloride tetrahydrate
 (MnCl$_2$.4H$_2$O) _____ 3.3
Sodium acetate trihydrate
 (NaC$_2$H$_3$O$_2$.3H$_2$O) _____ 93.7
Glycerine _____ 3.0

Still another satisfactory thermophoric composition is as follows:

Percent
Manganous chloride tetrahydrate
 (MnCl$_2$.4H$_2$O) _____ 3.3
Sodium acetate trihydrate
 (NaC$_2$H$_3$O$_2$.3H$_2$O) _____ 94.0
Ethylene glycol (CH$_2$OH.CH$_2$OH) _____ 2.7

If different temperatures of operation are desired, the proportions in the above compositions may be varied without disturbing the desired action of the compositions.

If a mass of any one of the above compositions is subjected to heating, the heat is stored by the conversion of the sodium acetate in the thermophoric composition from its crystal form to its liquid form. Ordinarily, the heating is discontinued after the crystalline mixture has been substantially all converted into liquid form. Normally, external heat should not be applied at a temperature greatly in excess of 75° C., for mixtures of the above proportions of ingredients, because temperatures in excess of this value are sometimes destructive to the thermophoric compositions.

If the melted thermophoric composition is now allowed to cool, the sodium acetate slowly recrystallizes. The slow recrystallization of the sodium acetate releases the latent heat of fusion of this substance, and this slowly relieved latent heat of fusion is the desired heat-emitting property of the composition.

The manganous chloride is introduced into the thermophoric composition because of its property of changing from the tetrahydrate to the dihydrate form at a temperature of the order of 58° C., which is approximately the same temperature at which sodium acetate loses its water of crystallization. When the melted mixture is cooling, and giving off heat, the change from manganous chloride dihydrate to manganous chloride tetrahydrate removes water from the melt, thus tending to prevent supersaturation of the melt and consequent failure of the sodium acetate to recrystallize.

The glycerine and ethylene glycol of the respective two mixtures including these substances as given above, are for the purpose of suppressing the formation of large crystals during recrystallization. It is generally found more satisfactory to prevent the formation of large crystals, and hold the mass, on recrystallization, to relatively small crystals.

In preparing the thermophoric composition, care should be exercised not to expose it to the air for too long a time, such as more than six hours, because there is a tendency for the manganous chloride to form manganese hydroxide upon extended exposure to the air.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

We claim:

1. A thermophoric composition comprising a mixture of a preponderant portion of sodium acetate trihydrate and manganous chloride tetrahydrate.

2. A thermophoric composition comprising a mixture of sodium acetate trihydrate and manganous chloride tetrahydrate, the sodium acetate trihydrate constituting in excess of the order of 90% of the mixture.

3. A thermophoric composition comprising a mixture of a preponderant portion of sodium acetate trihydrate and manganous chloride tetrahydrate, and a small portion of a liquid selected from the class consisting of glycerine and ethylene glycol.

4. A thermophoric composition comprising a mixture of sodium acetate trihydrate and manganous chloride tetrahydrate, the sodium acetate trihydrate constituting in excess of the order of 90% of the mixture, and less than the order of 3% of a liquid selected from the class consisting of glycerine and ethylene glycol.

5. A thermophoric composition substantially as follows:

| | Percent by weight |
|---|---|
| Manganous chloride tetrahydrate | 3.45 |
| Sodium acetate trihydrate | 96.55 |

6. A thermophoric composition substantially as follows:

| | Percent by weight |
|---|---|
| Manganous chloride tetrahydrate | 3.3 |
| Sodium acetate trihydrate | 93.7 |
| Glycerine | 3.0 |

7. A thermophoric composition substantially as follows:

| | Percent by weight |
|---|---|
| Manganous chloride tetrahydrate | 3.3 |
| Sodium acetate trihydrate | 94.0 |
| Ethylene glycol | 2.7 |

JOHN A. C. BOWLES.
RONALD LYMAN McFARLAN.